Patented Apr. 9, 1940

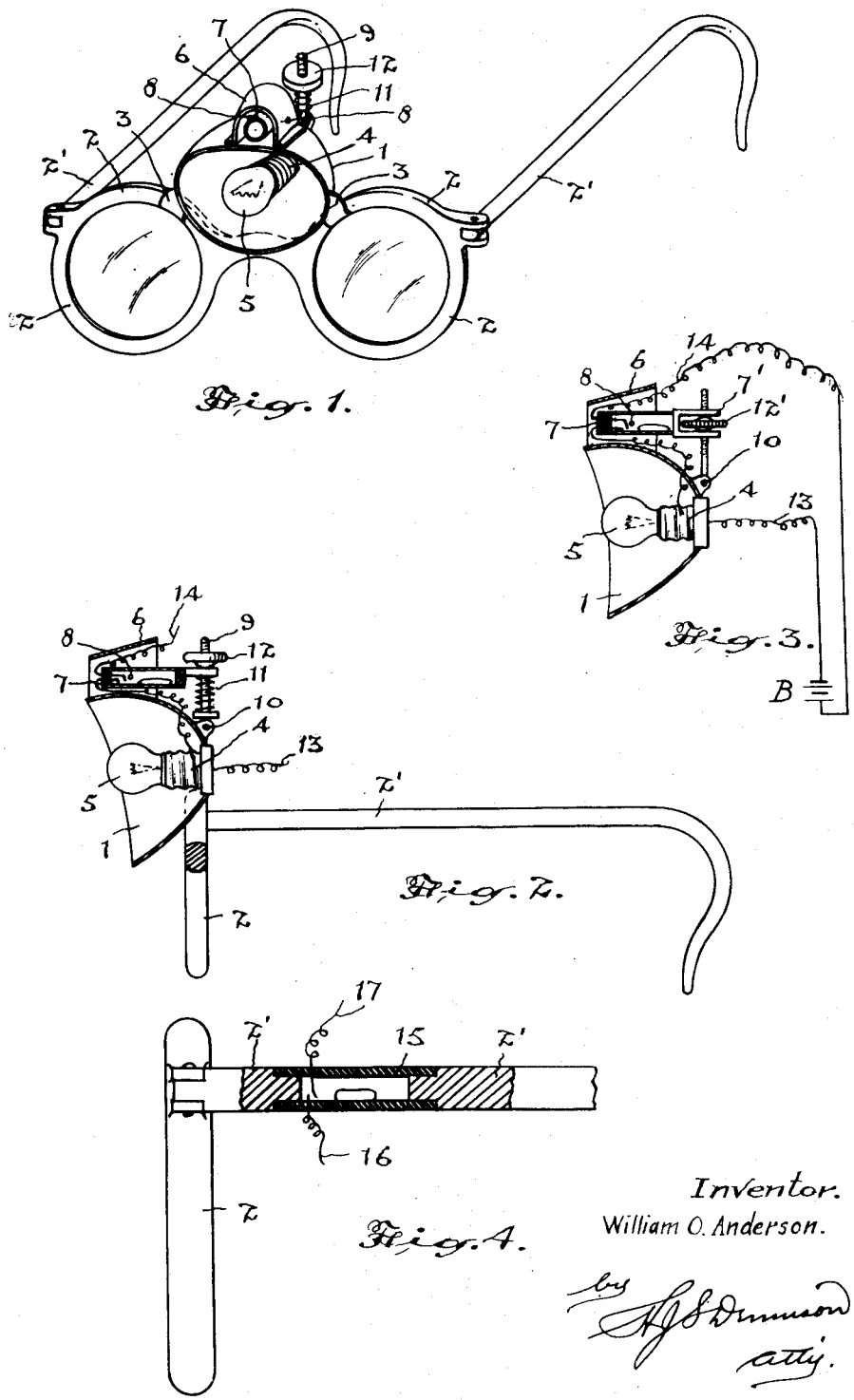

2,196,543

UNITED STATES PATENT OFFICE 2,196,543

AUTOMATIC LIGHT FOR SPECTACLES

William O. Anderson, Chesley, Ontario, Canada

Application May 16, 1938, Serial No. 208,165

10 Claims. (Cl. 240—2)

The principal object of this invention is to provide a lighting attachment for spectacles which will permit the direct and concentrated illumination of an area immediately in front of the observer and which will be automatically controlled by the movement of the head of the wearer so that when the head is raised the light will be cut off and again resumed when the head is lowered.

The principal feature of the invention resides in the novel combination with a pair of spectacles and an electric lamp mounted thereon of an automatic switch control of the mercury or gravity-actuated type which will bring the light automatically into play when the head is tilted forwardly and downwardly.

In the drawing Figure 1 is a perspective view of a pair of spectacles showing the present invention applied thereto.

Figure 2 is a side elevational part sectional view of the construction shown in Figure 1.

Figure 3 is a fragmentary side elevation of a modified form of adjustment means for the switch.

Figure 4 is a part sectional side elevation showing a modified form of switch incorporated in the ear piece.

In carrying the invention into practice I mount a reflector 1 between the rims 2 of a pair of spectacles preferably by suitable clips 3 and the reflector is provided with a suitable socket 4 for mounting a small electric lamp 5.

An arch-shaped shield member 6 is mounted on the top of the reflector and a mercury tube switch 7 is pivotally mounted at one end thereon on the pivot 8 and the other end extends rearwardly and is perforated to slidably receive a threaded adjustment member 9, the lower end of which is shown pivoted to a lug 10 on the reflector and encircled by a light compression spring 11 which tends to tilt the mercury switch upwardly in a counter-clockwise direction, while an adjusting screw 12 threaded on the member 9 is adapted to adjust the mercury switch in a clockwise direction against the tension of the spring.

Lead connections 13 and 14 from a suitable remote source of current such as a battery B as indicated in Figure 3 are connected respectively one with one terminal of the lamp 5 and the other to one terminal of the mercury switch, the other terminal of the mercury switch being connected to the other contact of the lamp, the arrangement being such that with the spectacles in position the tilting of the head forwardly and downwardly will cause the mercury in the tube 7 to close the contacts and light the lamp and when the head is again raised the switch will automatically open. The adjustment provides for a wide range of adaptability to suit operators working under various conditions.

In the form of the invention shown in Figure 3 the spring 11 is eliminated and a positive threaded adjustment is provided by the thumb nut 12' operating between the fork end 7' of the mercury switch 7.

As shown in Figure 4 the mercury switch may be incorporated in the ear piece 2' of the spectacles, as for instance by inserting a tubular length 15 at the forward end of which the terminals 16 and 17 are mounted, or the switch may be in the form of an attachment simply clamped on to the ear piece exteriorly.

The preferred form of switch to be applied to this invention is the mercury or liquid type, but a pivotal gravity-actuated switch of any suitable form may be used, the invention being in the adaptation of a tilting switch to a light circuit arranged on a pair of spectacles or a lamp carried on the head.

What I claim as my invention is:

1. The combination with a pair of spectacles having an electric lamp mounted thereon, of means for automatically lighting said lamp on the downward and forward tilting of the spectacles.

2. Means as claimed in claim 1 in which said means comprises a gravity-actuated switch.

3. Means as claimed in claim 1 in which said means comprises a mercury switch.

4. Means as claimed in claim 1 in which said means comprises a mercury switch, and means for adjusting the angularity thereof relative to the spectacles.

5. The combination with a pair of spectacles, having a reflector mounted thereon and an electric lamp in said reflector, of a mercury tube switch pivotally mounted on said reflector, and manually adjustable means co-operating with said tube for adjusting the same on said pivot mounting.

6. Means as claimed in claim 5 in which a guard member is secured to said reflector and extends about said mercury tube switch.

7. Means as claimed in claim 5 in which said manually adjustable means includes a threaded means co-operatively interposed between the reflector and one end of the mercury tube switch.

8. Means as claimed in claim 5 in which said manually adjustable means comprises a threaded member mounted at one end on said reflector and having a slidable relation with one end of said mercury tube switch, and a thumb nut is threaded on said member for positioning engagement with the tube.

9. The combination with a pair of spectacles having a lamp and reflector mounted thereon, of a mercury tube switch incorporated in one of the ear pieces of said spectacles for controlling said light in accordance with the angularity of the ear piece.

10. The combination with a pair of spectacles having a reflector mounted thereon and an electric lamp in said reflector, of a mercury tube switch pivotally mounted on said reflector, a threaded member mounted at one end on said reflector and having a slidable relation with one end of said mercury tube switch, a compression spring encircling said threaded member and engaging the mercury tube to move the same in one direction on its pivot mounting, and a thumb nut threaded on said threaded member and engageable with the mercury tube to move the same in opposition to said spring.

WILLIAM O. ANDERSON.